United States Patent [19]

Fenner

[11] 4,065,890
[45] Jan. 3, 1978

[54] FRAMEWORK JOINT

[76] Inventor: Wolfgang Fenner, Feldbergstrasse 56, 6204 Taunustein 2, Germany

[21] Appl. No.: 748,708

[22] Filed: Dec. 8, 1976

[30] Foreign Application Priority Data

Dec. 17, 1975 Germany .............................. 2556813

[51] Int. Cl.² .......................... E04F 19/00; E04B 2/62
[52] U.S. Cl. ......................................... 52/27; 52/127; 52/476; 52/488; 52/648; 285/396; 403/9; 403/172; 403/173; 403/349
[58] Field of Search ................. 52/476, 488, 648, 656, 52/127; 285/29, 361, 396, 402; 403/9, 171–175, 292, 349; 211/162; 248/152

[56] References Cited

U.S. PATENT DOCUMENTS

| 1,431,513 | 10/1922 | Cox | 403/349 X |
|---|---|---|---|
| 1,721,198 | 7/1929 | Athey | 403/171 X |
| 1,855,164 | 4/1932 | Balch et al. | 52/476 |
| 2,546,979 | 4/1951 | Cozzone | 403/173 |
| 3,346,909 | 10/1967 | Blackburn | 211/162 X |
| 3,399,856 | 9/1968 | Pecaut | 211/162 X |
| 3,789,562 | 2/1974 | DeChicchis et al. | 52/648 |
| 3,805,465 | 4/1974 | Dietrich | 52/475 |
| 3,864,051 | 2/1975 | Reid | 52/656 |
| 4,012,153 | 3/1977 | Pidgeon et al. | 52/656 X |

FOREIGN PATENT DOCUMENTS

| 1,130,897 | 10/1956 | France | 403/171 |
|---|---|---|---|
| 441,871 | 1/1968 | Switzerland | 403/174 |

Primary Examiner—Alfred C. Perham
Attorney, Agent, or Firm—Webb, Burden, Robinson & Webb

[57] ABSTRACT

A framework comprising hollow rods connected at their ends by connecting members. The hollow rods and connecting members are secured by a novel bayonet connection.

13 Claims, 17 Drawing Figures

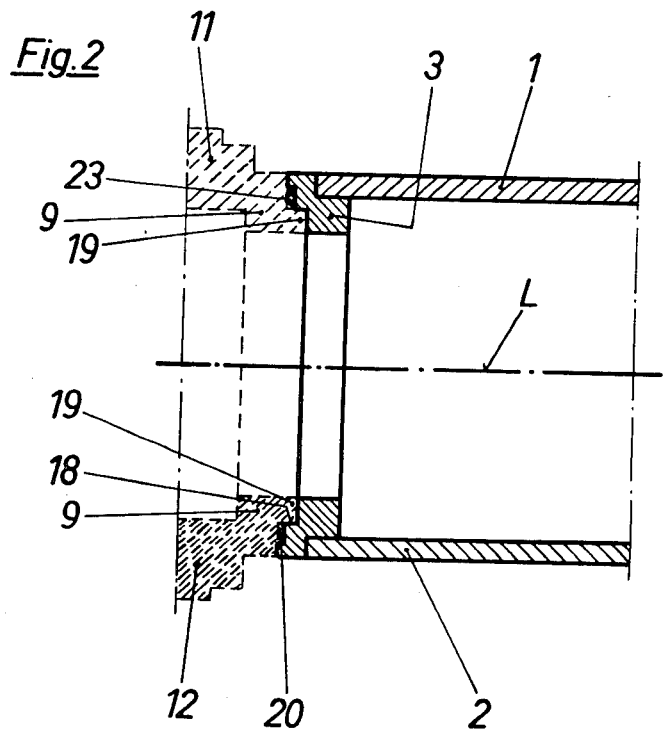
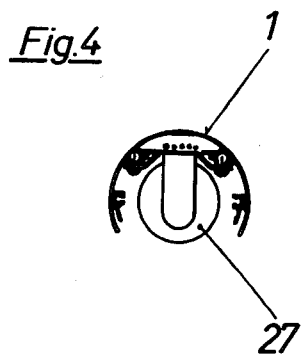
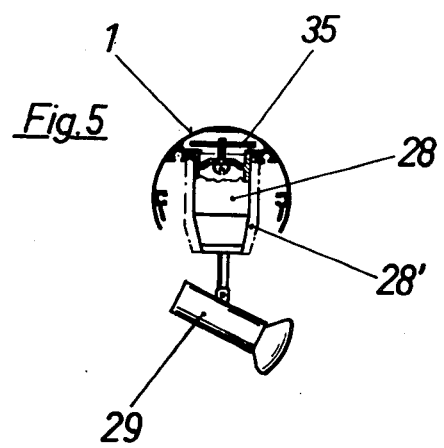

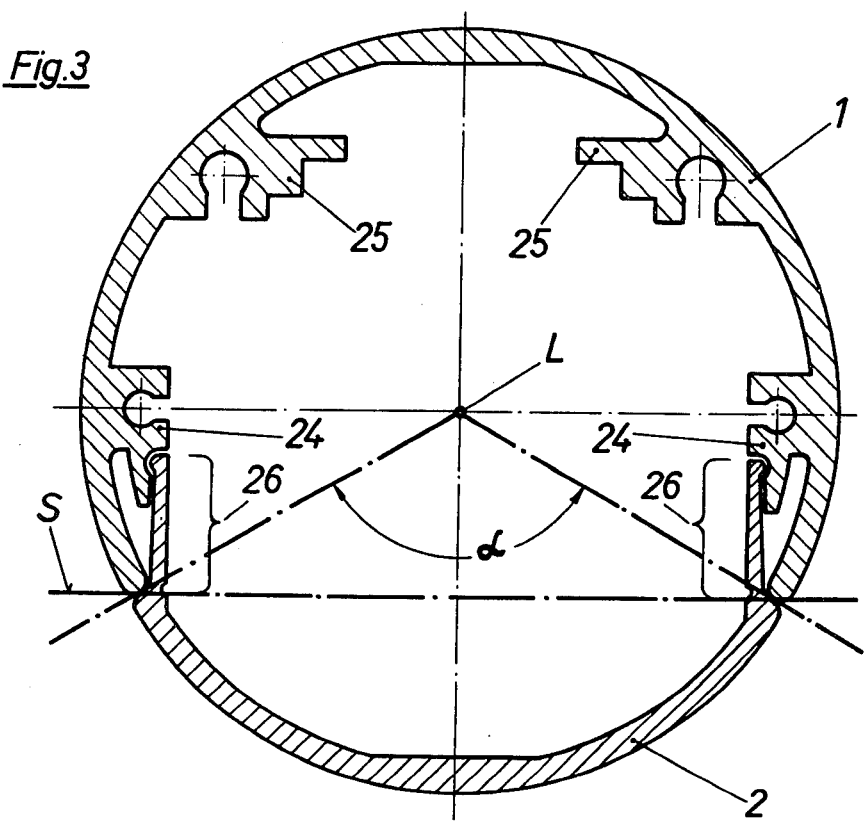
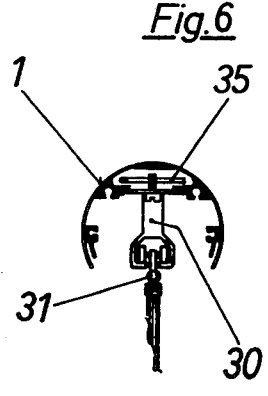
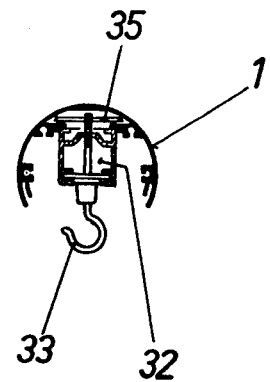

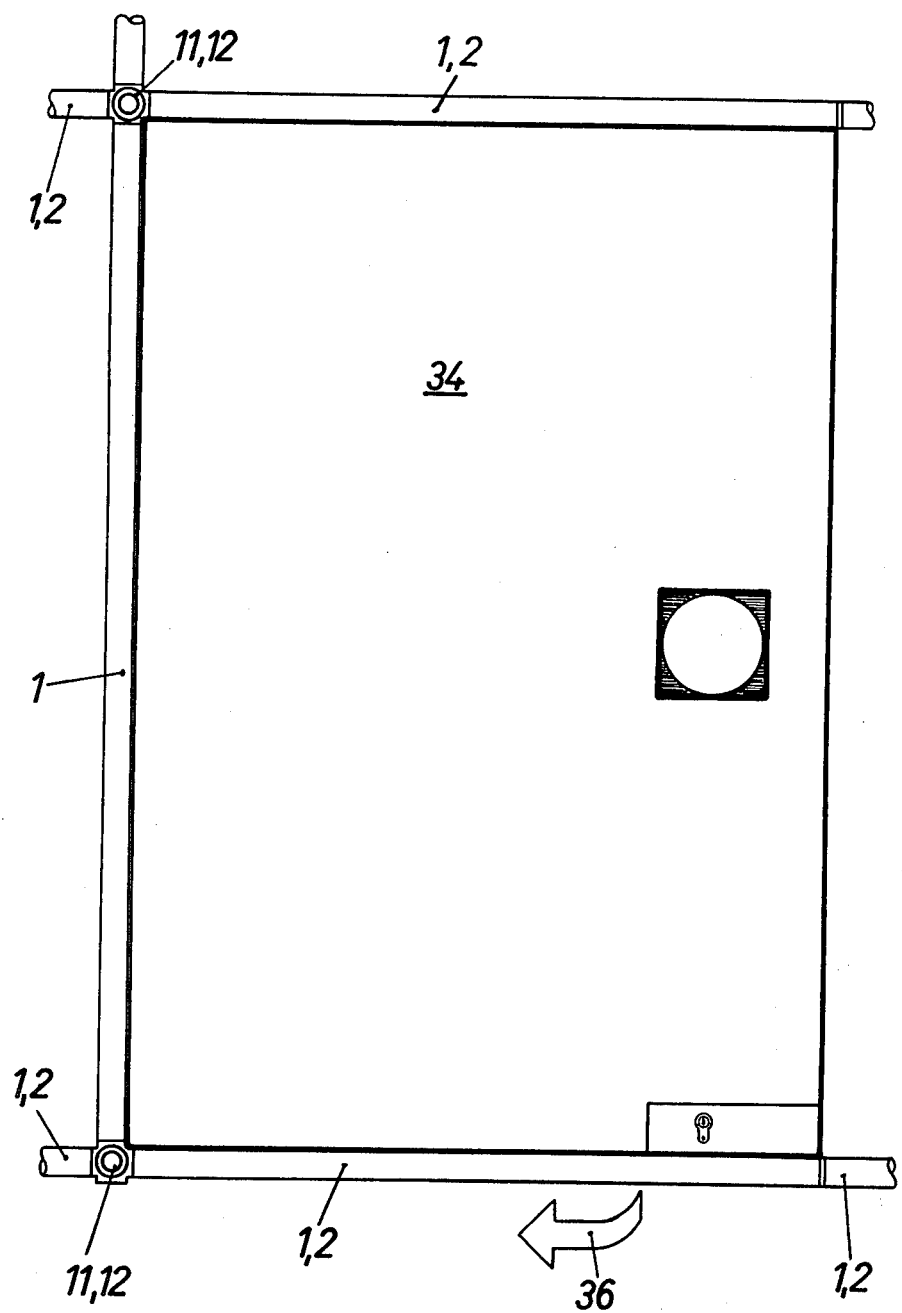

Fig.10
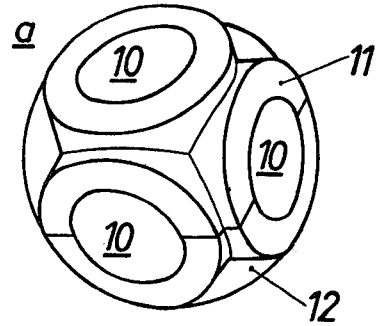
a
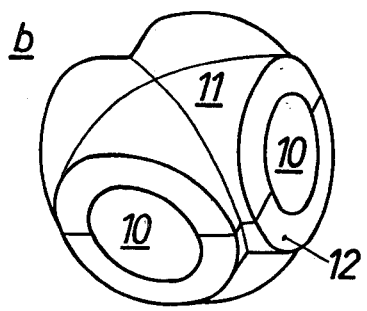
b
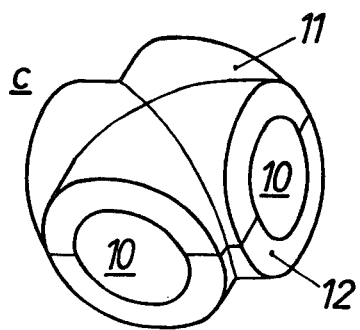
c
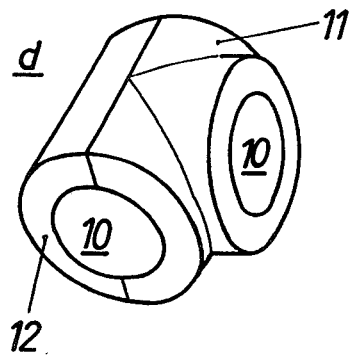
d
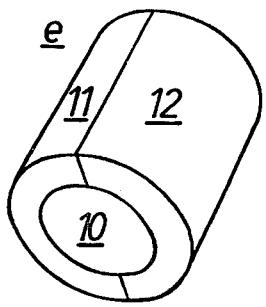
e
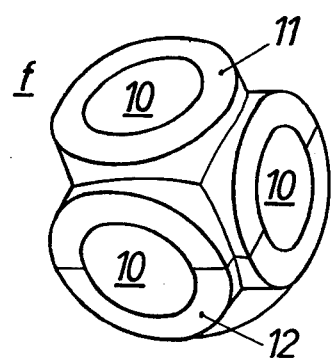
f
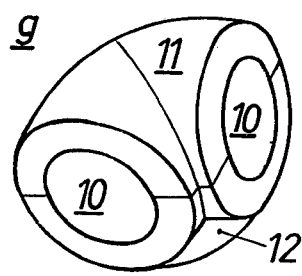
g
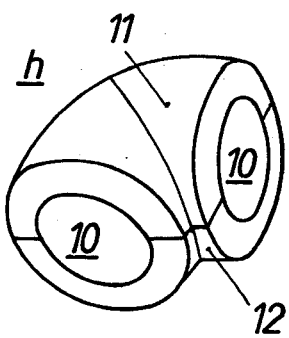
h

FRAMEWORK JOINT

The invention relates to frameworks of hollow rods and coupling members useful for constructing sales booths, partition walls and dividers, dressing rooms, displays, show showcases and the like.

A known framework consists of hollow rods threaded at both ends and connectors having suitable threaded bores. This construction system, having numerous additional parts, enjoys wide application in construction of display cases at fairs and in shops. But, it has three basic disadvantages: First, the manufacturing procedure for the individual parts belonging to the prior art unit involves threading bores and ends of the hollow rods. Second, it has a time-consuming application, as in the case of a large space framework, the very numerous hollow rods must all be turned into place at both ends. Third, a very serious drawback is to be found in the fact that this well known system has not been designed for the installation of supply lines for delivering water and electricity into the system. All that can be done is to bolt spotlights to the connecting members. Electric cables and water lines must be laid in disturbingly visible manner on the outside of the hollow rods and must be secured with supplemental means. When presenting wares at fairs and in shops, however, it is extremely important that for the proper illumination of the objects, the space framework be equipped with numerous lighting fixtures at points which will provide the optimum visual effect for the illumination of the article at the proper time.

It is the object of the invention to make a frame which avoids the above mentioned drawbacks and which can be made more simply and cheaply, can be assembled in a simpler and quicker manner, and can be equipped at any desired point with any desired lighting fixtures. The supply mains, such as electric cables and water lines, are simultaneously integrated into the system in such a way that they require no supplemental mounting means and are housed in the construction unit in an outwardly invisible manner.

Briefly, according to this invention there is provided a framework comprising hollow rods or tubes with an internal flange or collar at each end and longitudinally moveable guided sleeves at each end provided with an external flange or collar at one end for engagement behind an internal flange of the tube. One or more dogs at the other end of the sleeve, together with the sleeve, are insertable into a hollow connecting member. The connecting member has guide grooves in an internal flange. After insertion, the sleeve and attached dogs are rotated for the purpose of forming a bayonet union behind the internal flange of the opening of the connecting member.

The inner side of the internal flange of the openings associated with the connecting members runs in a radial direction and for practical purposes has a gradually ascending longer guide surface and a steeply ascending shorter guide surface between which an engagement recess is disposed for the dogs of the sleeve. A spring is disposed between the external flange of the sleeve and the inner flange of the tube.

Advantageously, the hollow rods or tubes are composed of two readily disengageable tube members separated by a sectional plane that runs parallel to the longitudinal axis.

To facilitate turning, the outer flange of the sleeve is subdivided by four recesses into four sections of equal length.

In a particularly preferred embodiment of the invention, the face of the flange at the end of the tubes has a centering bore and the connecting members have a centering flange that projects from the face of the opening. The centering flange is coaxial with the longitudinal axis of the tube and is arranged to enter the centering bore of the tubes.

A ring maybe mounted on the centering flange, the said ring having an inner nose for engagement in a recess — twice the width of the nose — of the centering flange, and also having an outer nose which strikes against a projection of the radially directed outer surface of the inner flange of the tube.

For practical purposes, the hollow rod is divided by two planes running parallel to the longitudinal axis having an included angle $\alpha$ (alpha) of about 120°. The inside of the larger tube portion may have projections to which the smaller tube portion may be clipped by means of resilient clip noses, the inner flange may be screwed on, and a fluorescent lamp, current connecting bars of various sizes, guide rails for drapery hooks and garment hooks, as well as doors, may be selectively mounted and secured by means of conventional screw clips that can be engaged behind the projections.

For practical purposes the inside projections of the larger tube member consist of contoured strips which are made together with the tube member in the extrusion process and are continuous along the length thereof.

A spacer ring may be mounted on the centering flanges of two adjacent connecting members, the said ring together with inserted sleeves and Woodruff key springs produce a bayonet union between two connecting members.

A plate may close an opening in a connecting member. The cover plate sets on the centering flange with an annular groove and closes off the opening. The coverplate has two dogs which are insertable into the guide grooves of the inner flange of the insertion opening and are rotatable for the purpose of forming a bayonet union behind the inner flange of the insertion opening.

Advantageously, the half shells of the connecting members are identical in design and are made by pressure casting.

Square plates may be clamped firmly at all four corners by the cover plates that are secured to the connecting members thus turning the frame into a wall, etc.

Further details of the construction unit will be explained more fully below with the aid of the patent drawings in which.

FIG. 2 shows a longitudinal section through an end of the tube.

FIG. 3 shows a cross section through a tube in twice the scale of FIG. 2.

FIGS. 4 to 7 show four different embodiments on a reduced scale and in cross section.

FIG. 8 is a side elevation of another embodiment in connection with a door.

FIGS. 10a to 10h are three-quarter views of eight different connecting members which are assembled from only six different shapes.

Figure 1:
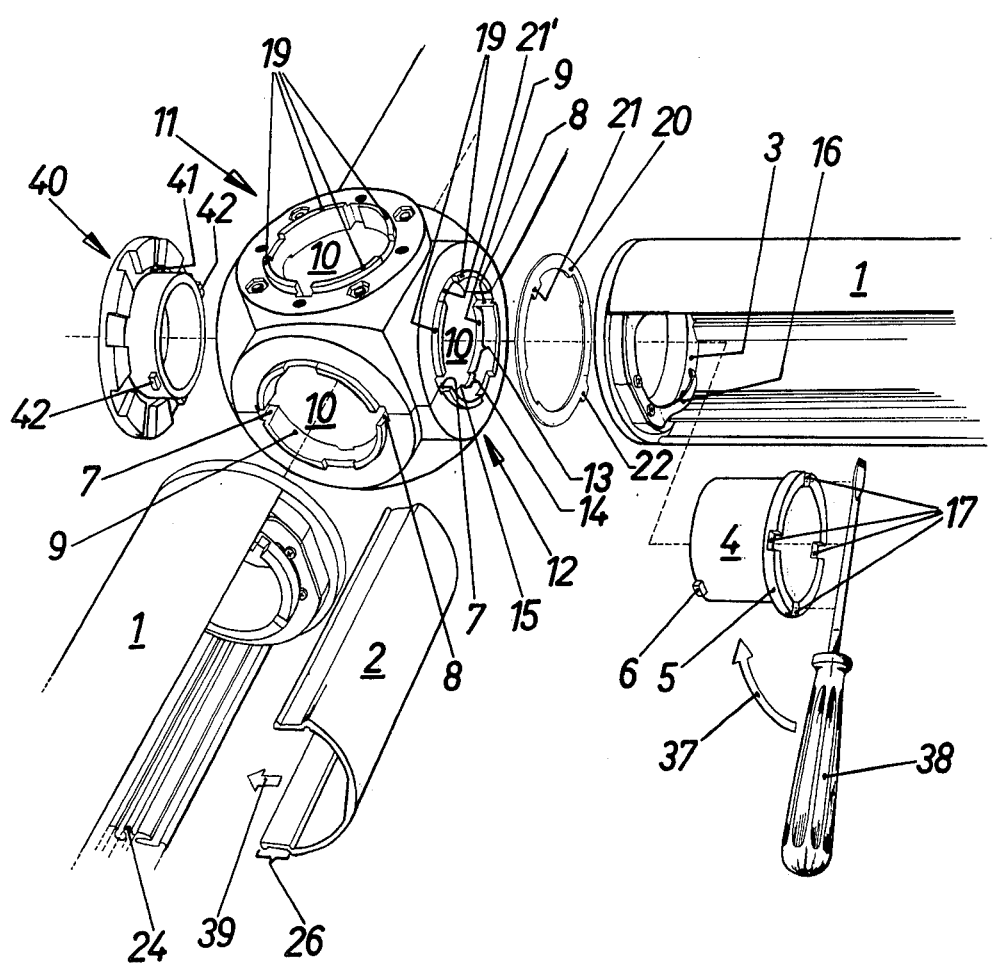
FIG. 1 shows an exploded view of two hollow tubes and a connecting member for building a frame according to this invention.

Referring to the embodiment shown in FIG. 1, the larger tube portion 1 has an internal (inwardly directed) annular flange 3 at its two ends. In each internal flange 3 a longitudinally moveable guided sleeve 4 is disposed whose outer (outwardly directed) annular flange 5 engages the internal flange 3 of the tube from behind. At its other end sleeve 4 is provided with one or more dogs 6 which are inserted into guide grooves 7 and 8 of an annular flange 9 of two or more openings 10 in a hollow connecting member composed of two half shells 11 and 12. The dogs are turned behind flange 9 of opening 10 in order to form a bayonet union.

A radially running inner side of flange 9 of opening 10 has a gradually ascending (in the axial direction) guide surface 13 and another steeply ascending (in the axial direction) shorter guide surface 15 between which a recess 14 for engaging dogs of sleeve 4 are disposed. A spring 16 is disposed between outer flange 5 of sleeve 4 and internal flange 3 of tube 1,2.

Due to the configuration described above, the frames according to this invention offer basic advantages. First, the tubes, connecting members and the internal flange 3 are hollow so that a continuous connection is produced between the hollow inner chamber of tubes and the hollow connecting members. This is a necessary prerequisite for installing current bars, electric cables or water lines within the continuous hollow chambers. Second, the known threaded connection which is expensive to make and time consuming to engage is replaced by a bayonet union which can be locked and released with the aid of a simple tool (such as a screwdriver 38 which engages recesses 17 of outer flange 5 of sleeve 4) by turning in the direction of arrow 37. To lock the bayonet union, it is only necessary to insert sleeve 4 with its dogs 6 into guide grooves 7 and 8 of internal flange 9 of an opening 10. Thereupon with the aid of screwdriver 38 engaged in two aligned recesses 17, sleeve 4 is turned in the direction of arrow 37, causing dogs 6 of sleeve 4 to run up on a gradually ascending longer guide surface 13 thereby putting tension on spring 16, and come to rest in engagement recesses 14. If it is desired to release the thusly formed bayonet union, the screwdriver 38 is made to engage the other two aligned recesses 17 of outer flange 5 of sleeve 4 and is turned in the same direction of arrow 37 as in the locking process of the bayonet union. This causes dogs 6 to run up on a steeply ascending shorter guide surface 15 and reach guide grooves 7 and 8 where the sleeve, together with its dogs, is ejected due to the spring mechanism 16. Thus the movements in making and in releasing the bayonet union are identical and comprise merely the insertion of a screwdriver into two aligned recesses, and turning the screwdriver by 90°.

The third basic advantage consists of creating a hollow connecting member by using two half shells 11 and 12. This eliminates the necessity of making a threaded bore, and for the first time the possibility is afforded for using pressure casting for making the resilient edges that are necessary for a bayonet union.

The connecting members made from the two identical shaped parts 11 and 12 may be joined to one another by means of bolts in each of four corners. But the two shaped parts 11 and 12 can also be held together by providing the face of internal flange 3 of the tube with a centering bore 18 which serves to receive a centering flange 19 projecting from internal flange 9 of the connecting members about the opening and coaxially with longitudinal axis L of the tube.

A ring 20 mounted on centering flange 19 acts to hold the two shaped parts 11 and 12 together. But ring 20 also solves the additional problem of preventing each tube 1 which is connected to a connecting member from being rotated by more than 360° about its longitudinal axis. This is done in order to prevent electric cables that are laid in the tubes from being twisted off. This rotatability by not more than, but also not less than 360° is solved by providing ring 20 with an internal nose 21 which engages in a recess 21' — said recess being twice the width of the nose — of the centering flange and with the aid of an external nose 22 which strikes against a projection 23 on the radially running outer surface of internal flange 3 of the tube.

FIG. 1 also shows a cover plate 40 which is mounted with an annular groove 41 on centering flange 19 and which has two dogs 42 which can be inserted into guide grooves 7 and 8 of internal flange 9 of the opening. Then the cover plate with its dogs is turned behind the internal flange of the insertion opening so that the cover plate is likewise secured to connecting member 11,12 by means of a bayonet union in readily releasable manner.

It should be mentioned here that it is possible to connect two or more connectors 11,12 in a bayonet union by means of a simple spacer ring. This spacer ring is mounted on the centering flanges 19 of two adjacent connecting members and together with an inserted sleeve 4 and a mounted shaft disc spring or Woodruff key spring (not shown in the drawings) produces a bayonet union of two connecting members.

And it may also be seen from FIG. 1 that the smaller tube portion 2 is insertable into the larger tube portion 1 in the direction of arrow 39 and is clipped on by means of two resilient clip noses 26. Large tube portion 1 is provided with corresponding contoured strips 24 to hold clip noses 26 firmly.

The configuration of the interior of the larger tube portion is illustrated in FIG. 3. The sectional planes run parallel to longitudinal axis L and separates the two parts of the tubes 1 and 2 in such a way that straight connecting lines from the sectional edges of the tube wall to longitudinal axis L will include an aperture angle $\alpha$ of about 120°.

The other contoured ridges 25,25 which are located farther inside of the inner chamber of larger tube portion 1 serve as stops and also for securing various equipment which will be explained with reference to FIGS. 4 to 8. In FIG. 4 a fluorescent lamp 27 is shown bolted to contoured ridges 25. FIG. 5 shows that the two differently dimensioned large current bars 28 and 28' are laid against contoured ridges 25 and are bolted securely by means of conventional bolted straps 35. Then spotlights 29 may be secured at desired points in conventional manner. FIG. 6 shows another embodiment in which a guide rail 30 with drapery hooks is used. The embodiment of FIG. 7 illustrates a guide rail 32 and garment hooks 33 suspended therefrom.

FIG. 8 shows that even an entire door 34 may be inserted on a longitudinal side into the inner chamber of larger tube 1 and may be secured therein. The swingability of door 34 in the direction of arrow 36 is assured by the fact that the connection between tube 1 and the two connecting members 11,12 permits a swingability up to 360° at both ends in the manner already described above.

Figure 9:
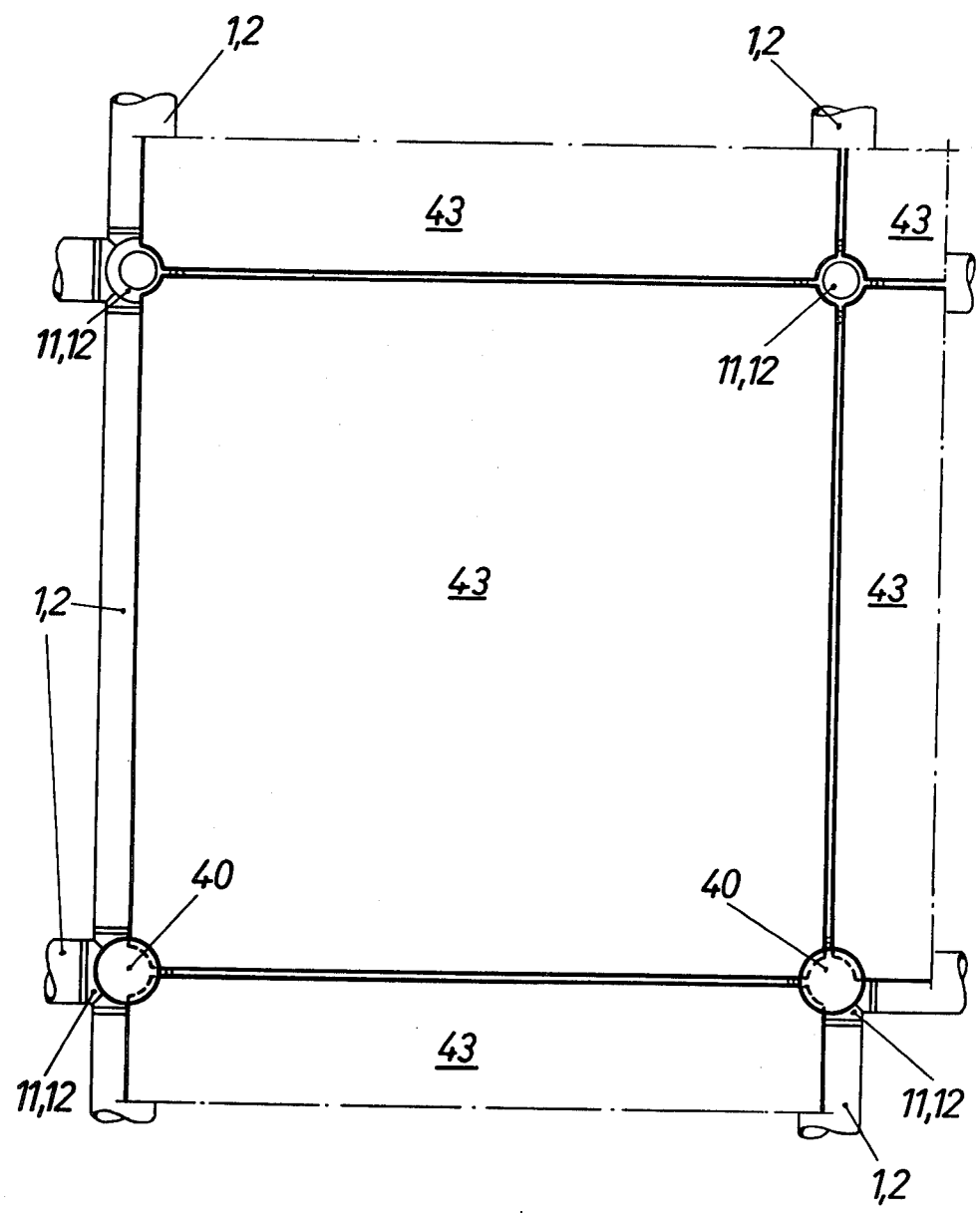
FIG. 9 is a side elevation of an embodiment using square plates.

FIG. 9 illustrates an embodiment of a space framework that is designed as a closed unit with the aid of plates 43. The square plates 43 are securely clamped to connectors 11,12 at all four corners by cover plates 40.

The significance of the fact that the connecting member is composed of two half shells is particularly evident from FIGS. 10a to 10h. These figures illustrate eight differently designed connecting members with differently disposed openings 10, but which are assembled from only six different shaped parts. Each shaped part can be manufactured individually in the simplest manner by pressure casting. The use of the six different shaped parts obviously makes the use of cover plates dispensable.

Having thus described the invention with the detail and particularity as required by the Patent Laws, what is desired protected by Letters Patent is set forth in the following claims.

I claim:

1. A frame comprising
   a plurality of hollow rods (1,2) each of which has an inwardly directed annular flange (3) at each end;
   axially displaceable and rotatable guided sleeves (4) coaxial within said hollow rods at each end, said sleeves having an outwardly extending annular flange (5) at one end for engagement behind the flanges of said tubes, said sleeves having one or more circumferentially spaced dogs radially extending at the end opposite the annular flange;
   a plurality of hollow connecting members having two or more openings (10) for receiving said guided sleeves (4) associated with said tubes, said connecting members having associated with each opening a cylindrical flange (9) with circumferentially spaced guide ways (7,8) therein for receiving said dogs on said guided sleeves, such that the guided sleeve after being inserted in said opening, with dogs and guideway aligned, may be rotated placing the dogs behind the cylindrical flange thus forming a bayonet connection.

2. A frame according to claim 1 in which springs bias the annular flanges of the sleeves and tubes axially apart and in which the cylindrical flanges associated with the openings in said hollow connecting members having gradually ascending (in the axial direction away from the opening) larger guide surfaces over which the dogs on the guided sleeves ride as the sleeves are rotated, sail cylindrical flanges having, at the end of the longer guide surfaces, recesses for receiving one of the dogs and to thereby resist easy rotation of said sleeves, the side of the recesses beyond the longer guide surfaces comprising a shorter axially ascending guide surface enabling the dogs to be rotated out of said recesses for disengagement by a torque great enough to overcome the axial spring bias.

3. The frame according to claim 1, in which the tubes (1,2) are releasably assembled from two tube portions (1,2) that are separated by planes running parallel to the longitudinal axis (L).

4. A frame according to claim 3, in which the annular flange (5) of the sleeve (4) is subdivided into four sections of equal length by four recesses in an axial face thereof (17).

5. A frame according to claim 1, in which the faces of the annular flanges (3) of the tubes have a centering bore (18) for receiving centering flanges (19) projecting from the cylindrical flanges (9) of the coupling members.

6. A frame according to claim 5, further comprising a ring (20) mounted on the centering flange (19), said ring having an internal nose (21) for engagement in a recess (21') of the centering flange, the said recess being twice as wide as the nose, and said ring having an external nose (22) for striking against a projection (23) on the radially running outer surface of the annular flange (3) of the tube.

7. A frame according to claim 3, in which the tube (1,2) is divided by planes that run parallel to the longitudinal axis having an included angle α (alpha) of about 120°.

8. A frame according to claim 7, in which the inner side of the larger tube portion (1) has projections (24,25) to which the smaller tube portion (2) may be clipped by means of resilient clip noses (26) and the annular flange (3) may be bolted, and to which a fluorescent lamp (27), current bars (28,28') of different sizes, guide rails (30,32) for drapery hooks (31) and garment hooks (33), as well as doors (34) may be selectively attached and may be fastened by means of conventional bolt straps (35) which engage behind the projections (25,25).

9. A frame according to claim 8, in which the inside projections of the larger tube portion (1) consist of longitudinally continuous contoured ridges which are made by the extrusion process together with the tube portion.

10. A frame according to claim 5, in which a spacer ring is mounted on the centering flanges (19,19) of two adjacent connecting members, the said ring, together with an inserted sleeve (4) and a mounted Woodruff key spring, producing a bayonet union of the two connecting members.

11. A frame according to claim 5, in which a cover plate (40) is mounted with an annular groove (41) on the centering flange (19) and closes off an opening (10), the said cover plate having two dogs (42,42) which are insertable into the guide grooves (7,8) of the internal flange (9) of the opening and are rotatable for the purpose of forming a bayonet union behind the internal flange of the opening.

12. A frame according to claim 1, in which the connecting members comprise half shells (11,12) which are identical in design whereby they may be made by pressure casting.

13. A frame according to claim 11, in which square plates (43) are clamped firmly at all four corners by the cover plates (40) which are secured to the connecting members (11,12).

* * * * *